United States Patent
Bryant et al.

(10) Patent No.: US 12,030,206 B2
(45) Date of Patent: *Jul. 9, 2024

(54) PRODUCING HOLES IN GLASS CONTAINERS

(71) Applicant: Owens-Brockway Glass Container Inc., Perrysburg, OH (US)

(72) Inventors: Jessica Bryant, Sylvania, OH (US); Brian Chisholm, Sylvania, OH (US); David Hoadley, Perrysburg, OH (US); Trent Jones, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/885,929

(22) Filed: Aug. 11, 2022

(65) Prior Publication Data

US 2023/0046184 A1 Feb. 16, 2023

Related U.S. Application Data

(60) Provisional application No. 63/232,625, filed on Aug. 12, 2021.

(51) Int. Cl.
*B26F 1/00* (2006.01)
*B23K 26/382* (2014.01)
(Continued)

(52) U.S. Cl.
CPC .......... *B26F 1/0053* (2013.01); *B23K 26/389* (2015.10); *B23K 26/40* (2013.01);
(Continued)

(58) Field of Classification Search
CPC .......... B65D 17/50–508; B65D 77/225; B65D 85/73
See application file for complete search history.

(56) References Cited

U.S. PATENT DOCUMENTS

| 638,022 A | 11/1899 | Lemyre et al. |
| 2,997,397 A | 8/1961 | Doulgheridis |

(Continued)

FOREIGN PATENT DOCUMENTS

| DE | 850984 C | 9/1952 |
| EP | 3290158 A1 | 3/2018 |

(Continued)

OTHER PUBLICATIONS

KR-101436627-B1 Machine Translation Clarivate Analytics Retrieved Nov. 30, 2023. (Year: 2023).*

(Continued)

*Primary Examiner* — Lisa L Herring (57) ABSTRACT

A glass container that includes a base defining a hole, and methods of manufacturing and using the glass container, is disclosed. The glass container is manufactured by providing the container and cutting a hole in a wall of the container. The hole may be cut into the wall by any technique in which glass material is separated from the wall including by mechanical shearing, thermal energy, and/or fluid impingement. To use the glass container, a deformable blow-out plug may be inserted into the hole to fluidly seal the hole, a liquid beverage may be introduced into the container, a closure may be coupled to the container to close the container and provide a pressurizable package, and thereafter the package may be internally pressurized by introducing a pressurizing gas into the package.

13 Claims, 4 Drawing Sheets

(51) Int. Cl.
| | |
|---|---|
| *B23K 26/40* | (2014.01) |
| *B26F 1/26* | (2006.01) |
| *B65D 1/02* | (2006.01) |
| *B65D 1/06* | (2006.01) |
| *C03B 33/06* | (2006.01) |
| *C03B 27/02* | (2006.01) |

(52) U.S. Cl.
CPC .............. *B26F 1/26* (2013.01); *B65D 1/0207* (2013.01); *B65D 1/0261* (2013.01); *B65D 1/06* (2013.01); *C03B 33/06* (2013.01); *C03B 27/028* (2013.01)

(56) References Cited

U.S. PATENT DOCUMENTS

| | | | |
|---|---|---|---|
| 3,380,621 | A | 2/1967 | Rissberger, Jr. et al. |
| 3,661,547 | A * | 5/1972 | Nakayama ................ C03B 9/30 65/77 |
| 4,762,241 | A | 4/1988 | Lang |
| D302,565 | S | 8/1989 | Bertschmann |
| 4,955,164 | A | 9/1990 | Hashish et al. |
| 7,294,354 | B2 | 11/2007 | Gunter et al. |
| 7,596,931 | B2 | 10/2009 | Gunter et al. |
| 2008/0128047 | A1 | 6/2008 | Billings et al. |
| 2013/0112648 | A1 | 5/2013 | Cohen et al. |
| 2014/0070431 | A1* | 3/2014 | Hatherell ................ B65D 85/73 261/37 |
| 2017/0183137 | A1 | 6/2017 | Walton et al. |
| 2017/0283299 | A1 | 10/2017 | Bookbinder et al. |
| 2018/0134600 | A1* | 5/2018 | Morhauser ............. C03B 19/09 |
| 2018/0326647 | A1* | 11/2018 | Mikajiri ................ B29C 49/071 |
| 2019/0322565 | A1 | 10/2019 | Witzmann et al. |
| 2021/0107822 | A1* | 4/2021 | Bourque ................ C03B 33/04 |
| 2023/0002137 | A1* | 1/2023 | Hoadley ................ B65D 83/70 |
| 2023/0192380 | A1* | 6/2023 | Hoadley ................ B65D 83/70 220/203.01 |

FOREIGN PATENT DOCUMENTS

| | | | |
|---|---|---|---|
| ES | 2006251 A6 | | 4/1989 |
| GB | 514918 | | 11/1939 |
| KR | 20130089100 A | * | 8/2013 |
| KR | 101436627 B1 | * | 9/2014 |

OTHER PUBLICATIONS

KR 20130089100-A Machine Translation Clarivate Analytics Retrieved Nov. 30, 2023. (Year: 2023).*

HGTV, "How to Turn a Liquor Bottle Into a Hummingbird Feeder", https://www.hgtv.com/outdoors/gardens/turn-a-heavy-bottom-glass-bottle-into-a-hummingbird-feeder, available per the Wayback Machine, Dec. 2020, 7 pages. (Year: 2020).*

Int. Search Report and Written Opinion, Int. Application No. PCT/US2022/040077, Int. Filing Date: Aug. 11, 2022, Applicant: Owens-Brockway Glass Container Inc., Date: Mar. 6, 2023.

Anonymous: "How to Drill Holes Through Glass: 9 Steps (with pictures)", https://web.archive.org/web/20210427192726/https://www.wikihow.com/Drill-Holes-Through-Glass#, Date Apr. 27, 2021, XP093011403.

"Wasserstrahlschneiden Eine Technologie im Aufwind Wasserstrahlschneiden—Eine Technologie im Aufwind", KMT GmbH, D-61231 Bad Nauheim, https://www.kmt-waterjet.de/PDF/KMT_Technology%20description_GER_101019.PDF, Date: Oct. 31, 2010, pp. 1-17, XP093011771.

* cited by examiner

PRODUCING HOLES IN GLASS CONTAINERS

TECHNICAL FIELD

This patent application discloses innovations related to glass containers and, more particularly, to glass containers that include a hole cut therein.

BACKGROUND

A food and beverage package typically includes a container to hold contents and a closure to close and open the container. In particular, a beverage package usually includes a container having a top opening to receive a beverage during filling of the container and to dispense the beverage during use, and a closure fastenable to the container to close off and open up the top opening of the container. In some applications, a beverage package may be internally pressurized and, thus, may need to be equipped with a pressure relief capability to guard against damage to the container that may result from excessive overpressurization. As one example, the beverage package may include a pressure relief valve or a deformable blow-out plug incorporated into a hole in the wall of the container to automatically vent the interior volume of the package to atmosphere when the internal pressure of the package exceeds a predetermined threshold.

Producing a hole with precision in a container made of glass presents unique challenges compared to containers made of other materials. In comparison to plastics and metals, for example, glass is relatively hard and brittle. To that end, a glass container is much less deformable and pliable than a plastic container or a metal container, which renders a glass container more susceptible to cracking or other forms of damage or localized weakening compared to containers formed of plastic or metal when there is an attempt to cut a hole into the glass container. And because glass containers are often expected to withstand high internal pressures, any cracks or flaws produced in the glass container during hole formation may cause the container to break or burst at a lower-than-anticipated internal pressure. The mechanical properties of glass in combination with the expected internal pressurization of a glass container makes precision hole formation a challenging endeavor. This is particularly the case if the hole will have to support a deformable blow-out plug and permit the plug to be ejected at the correct pressure with repeatable performance while, at the same time, not overly weakening the container.

SUMMARY

A glass container with a defined hole as well as a method of manufacturing and using the glass container is disclosed. The hole may be cut into the wall of a base of the container by any technique in which glass material is separated from the base of the wall to form the hole including, for example, by mechanical shearing, thermal energy, and/or fluid impingement. The hole has a sectional shape that is established by a plane that extends through the wall of the base and lies orthogonal to a longitudinal axis of the container, and which may assume any of a variety of shapes including a circle, ellipse, triangle, diamond, rectangle, hexagon, octagon, or parallelogram, to name but a few options. The hole may even be tapered along a hole passage axis in either direction. Preferably, the hole is formed by water jet cutting and, if necessary, an interior surface of the container is shielded from the water jet that passes through the wall of the base during cutting to prevent the inner surface of the container from being abraded. After the glass container is formed and the hole is cut in the wall of the base of the container, a deformable blow-out plug may be inserted into the hole to fluidly seal the hole, a liquid beverage may be introduced into the container, a closure may be coupled to the container to close the container and provide a pressurizable package, and thereafter the package may be internally pressurized by introducing a pressurizing gas into the package.

DETAILED DESCRIPTION

The present disclosure is directed to glass containers in which a hole is formed, for example, to accommodate a pressure relief blow-out plug. The disclosed methods for producing such holes and for installing pressure relief blow-out plugs in the holes are tailored for glass containers and take into consideration the unique properties of glass containers, which, as discussed above, is more susceptible to cracking and damage when forming a hole therein as compared to plastic and metal containers.

Figure 1:
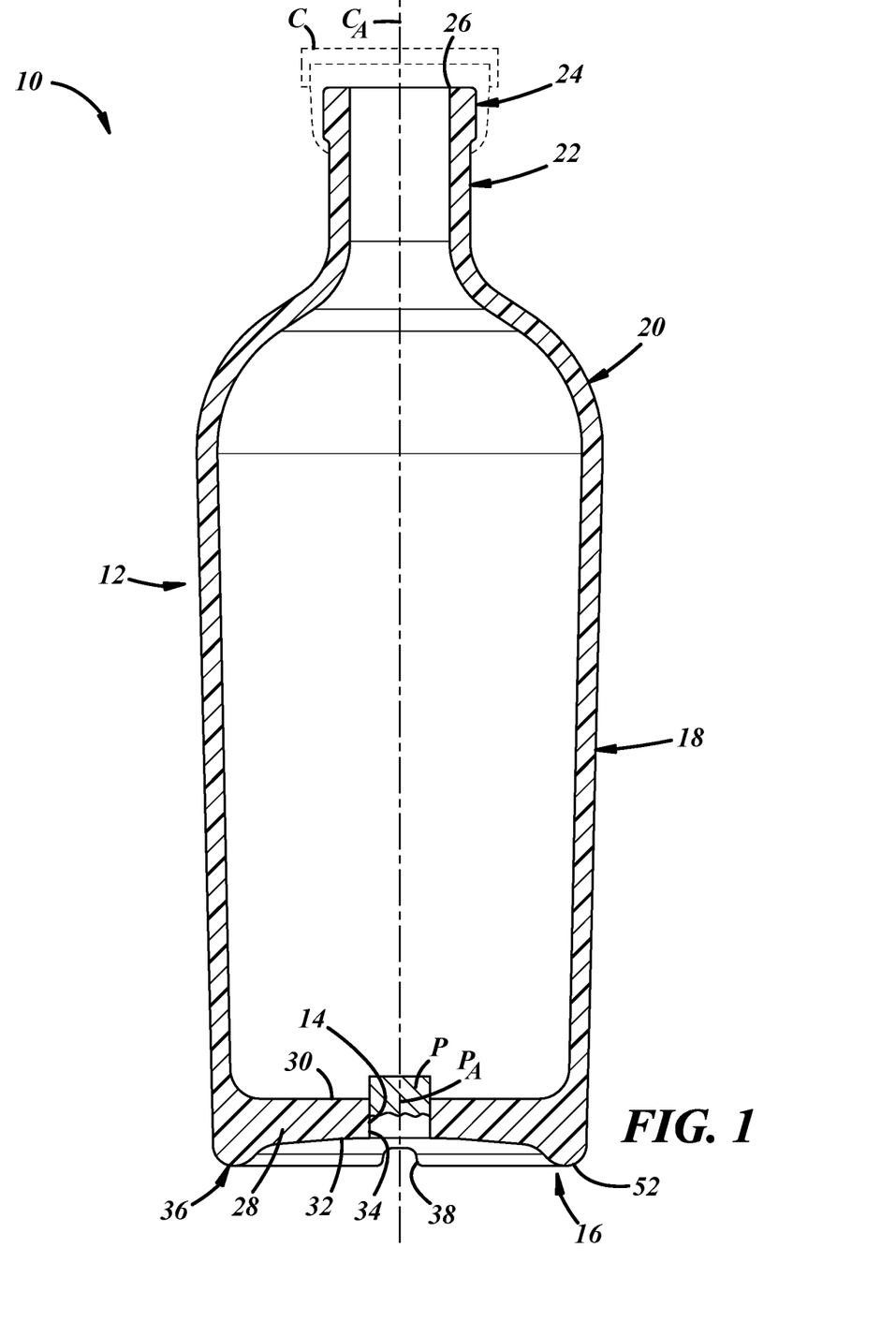
FIG. 1 is an elevational cross-sectional view of a glass container having a hole in a wall of the container in accordance with an illustrative embodiment of the present disclosure.

With specific reference to the drawing figures, FIG. 1 shows an illustrative embodiment of a package 10 including a container 12 that extends along and is centered about a longitudinal container axis CA. The illustrated container 12 is composed of glass that may be suitable for use with pressurized packaging, such as soda-lime-silica glass. In any case, the illustrated container 12 has a hole 14 defined in a base 16, a body 18 extending away from the base 16 along the longitudinal container axis CA, a shoulder 20 extending away from the body 18, and a neck 22 extending away from the shoulder 20 and terminating in a neck finish 24 having an open mouth 26 through which the longitudinal container axis CA extends. Although not illustrated, a liquid, for example, a liquid beverage, may be introduced into the container 12 through the open mouth 26, and a closure C may be coupled to the container 12 to close and seal the open mouth 26 so that the package 10 may be internally pressurized. In the illustrated embodiment, the hole 14 is defined in the base 16 of the container 12 and receives a pressure relief blow-out plug that seals the container 12 and prevents the beverage from escaping the container 12 so long as the internal pressure of the package 10 does not exceed a predetermined threshold. The predetermined threshold for pressure may be any desired pressure level although, in many applications, the threshold is set to some level below the breakage pressure of the package—i.e., the pressure at which the container 12 will burst. In one example, the predetermined threshold for pressure may lie anywhere between 100 psig and 300 psig or, more narrowly, between 140 psig and 275 psig.

The base 16 includes a wall 28 having an interior surface 30 within the container 12 and an exterior surface 32 outside of the container 12. The hole 14 extends along a hole passage axis PA, which, in the illustrated embodiment, is the same as the longitudinal container axis CA, and is open at each of the interior and exterior surfaces 30, 32. In other embodiments, the hole passage axis PA may be oriented at an angle with respect to the longitudinal container axis CA or it may be parallel to and spaced apart from the longitudinal container axis CA. The wall 28 includes a circumferential passage surface 34 that extends through the wall 28 between the interior and exterior surfaces 30, 32 and specifically defines the hole 14. The circumferential passage surface 34 may be of straight cylindrical shape, as shown, such that the hole 14 assumes a circular sectional shape, or it may assume any of a variety of other shapes, including those described below in conjunction with FIGS. 5 and 6. Also, the base 16 may include a heel 36 that peripherally surrounds the wall 28 and establishes a bottom surface 52 of the container 12. The heel 36 extends between the bottom surface 52 of the container 12 and the body 18 and may define at least one notch 38 in the bottom surface 52. When the base 16 includes the heel 36, the wall 28 may be pushed up or punted such that the exterior surface 32 of the wall 28 is spaced upwardly away from the bottom surface 52 established by the heel 36.

Figure 5:
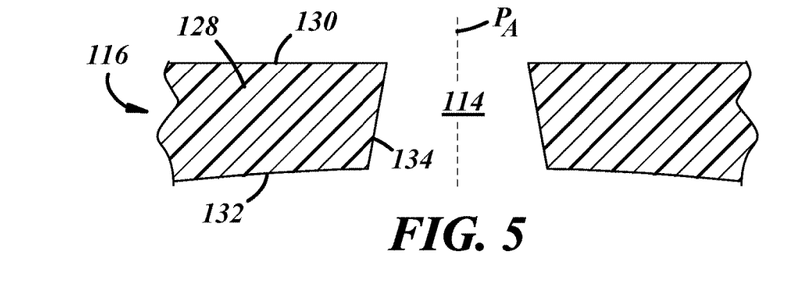
FIG. 5 is a fragmentary, schematic, cross-sectional view of another embodiment of a glass container that has a hole which may be formed in accordance with illustrative embodiments of the present disclosure.
Figure 6:
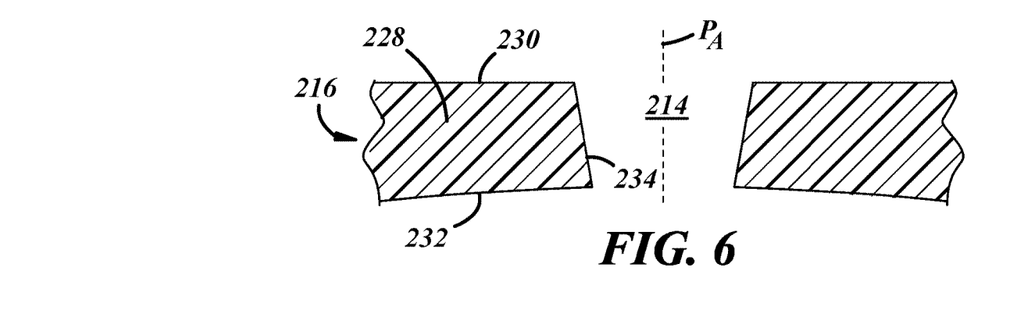
FIG. 6 is a fragmentary, schematic, cross-sectional view of yet another embodiment of a glass container that has a hole which may be formed in accordance with illustrative embodiments of the present disclosure.

In other embodiments, and referring now to FIGS. 5 and 6, the hole may have a frustoconical shape that narrows toward either the interior surface 30 or the exterior surface 32 of the wall 28. As shown in FIG. 5, the hole, which is designated by reference numeral 114, may be tapered so that the hole 114 increases in size (e.g., diameter or maximum width) along the hole passage axis PA from the interior surface 130 of the wall 128 to the exterior surface 132 of the wall 128. The hole 114 may be tapered in this way to facilitate outward displacement of a pressure relief blow-out plug (not shown) relative to the wall 128 upon excess pressure within the container 12. More specifically, upon excess pressure within the container 12, the tapered hole 114 may permit a body of the plug to progressively relax so that the plug can be more easily ejected from, or displaced with respect to, the wall 128. Even more specifically, the fit between the outer diameter of the plug body and the circumferential passage surface 134 becomes progressively looser as the plug body moves through the hole 114. Accordingly, this configuration may promote quick pressure relief and facilitate consistent performance of plug displacement.

Additionally, and as shown in FIG. 6, the hole, which is designated by reference numeral 214, may be tapered so that the hole 214 decreases in size (e.g., diameter or maximum width) along the hole passage axis PA from the interior surface 230 of the wall 228 to the exterior surface 232 of the wall 228. The hole 214 may be tapered in this way to impede outward displacement of a pressure relief blow-out plug (not shown) relative to the wall 228. More specifically, upon excess pressure within the container 12, the tapered hole 214 may serve to progressively constrict a body of the plug so that the plug is not so easily ejected from, or displaced with respect to, the wall 228. Even more specifically, the fit between the outer diameter of the plug body and the circumferential passage surface 234 becomes progressively tighter as the plug body moves through the hole 214 and then eventually clears the hole 214. Accordingly, this configuration may render the plug more difficult to be removed from the container 12 so as to promote more consistency in the particular overpressure condition within the container 12. The more consistent overpressure condition may be desirable when seeking to avoid plug displacement or ejection when there is a transient spike in overpressure in the container 12 and, instead, promote plug displacement or ejection only during a relatively persistent overpressure condition in the container 12.

The tapers of the tapered holes 134, 234 shown in FIGS. 5 and 6 may be straight tapers, as in the illustrated embodiments, and may be provided according to a cone angle between 1 and 20 degrees, including all ranges, sub-ranges, endpoints, and values in that range. More specifically, the cone angle may be between 1 and 5 degrees, including all ranges, sub-ranges, endpoints, and values in that range. In other embodiments, the taper(s) instead could be of excurvate and/or incurvate shape, or instead could be partly straight and partly excurvate and/or incurvate. In any event, and with reference to the glass container 12, the tapered hole 114 depicted in FIG. 5 widens or increases in size along an axially outward direction, and the tapered hole 214 depicted in FIG. 6 narrows or decreases in size along an axially outward direction. And, although not separately illustrated, the outer circumferential peripheries of bodies of pressure relief blow-out plugs for the tapered holes 114, 214 may be shaped to correspond with and contact the circumferential passage surface 134, 234 of the wall 128, 218 that defines the hole 114, 214.

Figure 2:
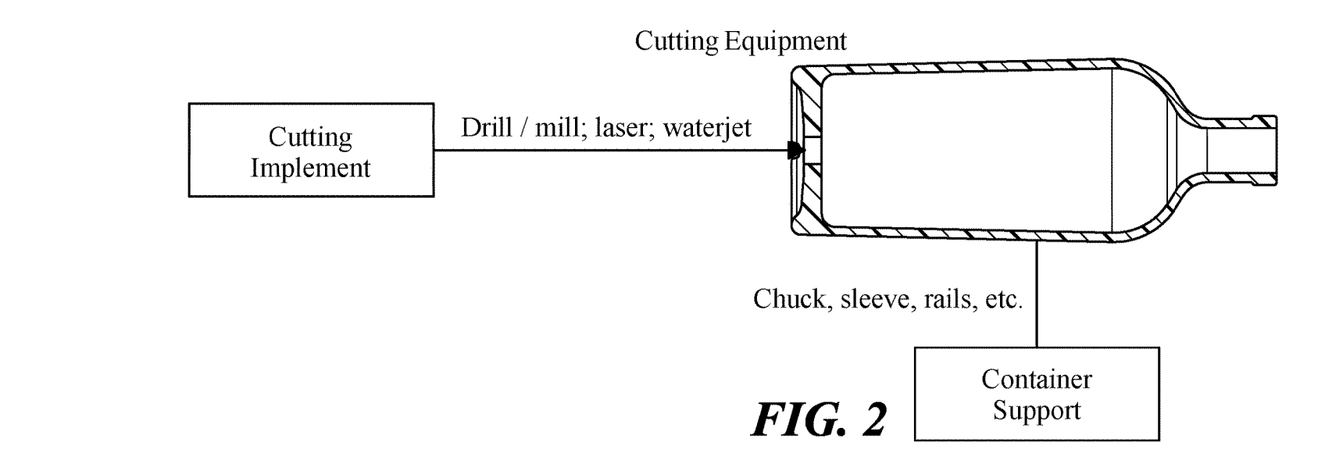
FIG. 2 is a schematic diagram of cutting equipment that may be used to produce the hole in the glass container of FIG. 1 in accordance with another illustrative embodiment of the present disclosure.

In general, and with additional reference now to FIG. 2, the hole 14, 114, 214 may be wholly or partially produced using one or more material removal techniques. As used herein, the term "cut" means the separation of material from surrounding material via mechanical shearing, thermal energy, and/or fluid impingement. More specifically, and as will be discussed in greater detail below, a cutting implement may be operated to cut the hole 14, 114, 214 from the container 12. The hole 14, 114, 214 may be cut in the wall 28, 128, 228 of the container 12, for instance, by drill or mill cutting, laser cutting, or waterjet cutting. Also, in some embodiments, the hole 14, 114, 214 may be partially formed during forming of the container 12, and then completed by cutting away material from the wall 28, 128, 228 of the base 16, 116, 216 of the container 12 after the container 12 is formed.

In a first embodiment of a method of producing the hole 14, 114, 214, the hole 14, 114, 214 may be cut with an abrasive cutting tool bit such as, for example, a fluted drill bit or an end milling bit, to gradually remove material by mechanically separating glass from the container 12. The abrasive cutting tool bit is preferably an abrasive diamond cutting tool bit. Cutting equipment that may be used in this embodiment includes a container support, for instance, a chuck to hold the container 12, and a cutting implement, for instance, a rotatably drivable spindle holding the cutting tool bit. The chuck and/or the spindle rotate and move axially to create relative motion between the cutting tool bit and the wall 28, 128, 228 of the container 12 and to mechanically engage the cutting tool bit with the wall 28, 128, 228 of the container 12. This mechanical rotating engagement between the cutting tool bit and the wall 28, 128, 228 removes a portion of the glass from the wall 28, 128, 228 to form the hole 14, 114, 214. The cutting equipment may also include a coolant system to introduce a cutting lubricant/coolant at the location of the wall 28, 128, 228 where the hole 14, 114, 214 is being formed. The use of an abrasive cutting tool to form the hole 14, 114, 214 is not considered to be equipment-intensive and may be optimal to minimize commercial variations in the glass containers.

In a second embodiment of a method of producing the hole 14, 114, 214, the hole 14, 114, 214 may be cut with a laser beam to gradually remove material by thermally separating glass from the container 12. Here, the cutting equipment may include a container support, such as a clamp or vice, to hold the container 12, and a cutting implement, for instance, a laser generator to produce a laser beam that is directed through optics and/or mirrors into impingement with the wall 28, 128, 228 of the container 12. The laser beam locally heats the glass to such a degree that a corresponding portion of the glass melts, vaporizes, or burns and is then discharged from the wall 28, 128, 228 to form the hole 14, 114, 214. Either the laser beam and/or the container 12 may be moved relative to the other to facilitate formation of the hole 14, 114, 214 as needed. The use of a laser beam to form the hole 14, 114, 214 offers cutting precision and a relatively contamination-free process, although care should be taken to avoid heating the glass too aggressively since glass can be sensitive to thermal shock that may cause cracking and/or leave the glass with residual internal stresses.

In a third embodiment of a method of producing the hole 14, 114, 214, the hole 14, 114, 214 may be cut with a pressured jet of water to gradually remove material by fluidly separating glass from the container 12. Here, the cutting equipment may include a container support, such as a clamp or vice or fixture, to hold the container 12, and a cutting implement, for instance, a high-pressure pump and nozzle to create a jet or stream of high-pressure water of, for example, greater than 50,000 psi. The pressurized jet of water is directed into impingement with the wall 28, 128, 228 of the container 12 at a supersonic velocity that may exceed 500 m/s or even 700 m/s. The water jet contacts the wall 28, 128, 228 of the container 12 and locally erodes a corresponding portion of the glass away from the wall 28, 128, 228 to form the hole 14, 114, 214. An abrasive grit such as aluminum oxide or garnet may be included in the water jet to increase the rate at which glass is removed from the wall 28, 128, 228 during formation of the hole 14, 114, 214. And, much like laser cutting, either the water jet and/or the container 12 may be moved relative to the other to facilitate formation of the hole 14, 114, 214 as needed. The use of a pressurized water jet to form the hole 14, 114, 214 is quick, efficient, and provides the interior and exterior surfaces 30, 130, 230, 32, 132, 232, and the circumferential passage surface 34, 134, 234, with good surface quality-all without having to input heat into the wall 28, 128, 238 of the container 12. Water jet cutting thus offers a high-quality and precise cut while minimizing localized heat generation so that little to no thermal stress is introduced to the container 12.

While water jet cutting is able cut a high-quality hole without locally heating the wall 28, 128, 238 of the container 12 or contacting the wall with a mechanical instrument, water jet cutting may, in some instances, abrade an inner surface 50 of the glass container 12 (FIG. 7), particularly in the body 18, shoulder 20, and/or neck 22 portions. As the pressurized jet of water cuts through the wall 28, 128, 238 to form the hole 14, 114, 214, the profile of the jet may loosen into a conical shape within the container 12 on the other side of the wall 28, 128, 238. This disbanding of the water jet results in high-pressure water and possibly abrasive grit being forcibly sprayed against the inner surface 50 of the container 12. Such abrading of the inner surface 50 of the glass container 12 can frost the container 12 and give it a hazy visual appearance in the locations where the glass is abraded. To counter the unwanted frosting of the inner surface 50 of the glass container 12, the inner surface 50 of the glass container may be shielded from at least a portion of the jet of water that passes through the wall 28, 128, 228 and into the inside of the container 12 during formation of the hole 14, 114, 214. This may involve, for example, inserting a hollow tube 40 into the container 12 and positioning the tube 40 so that it provides a barrier that shields and protects the inner surface 50 of the container 12 by capturing at least some of the portion of the pressurized water jet that passes through the wall 28, 128, 228 and into the inside of the container 12, as is shown generally in FIG. 7.

Figure 7:
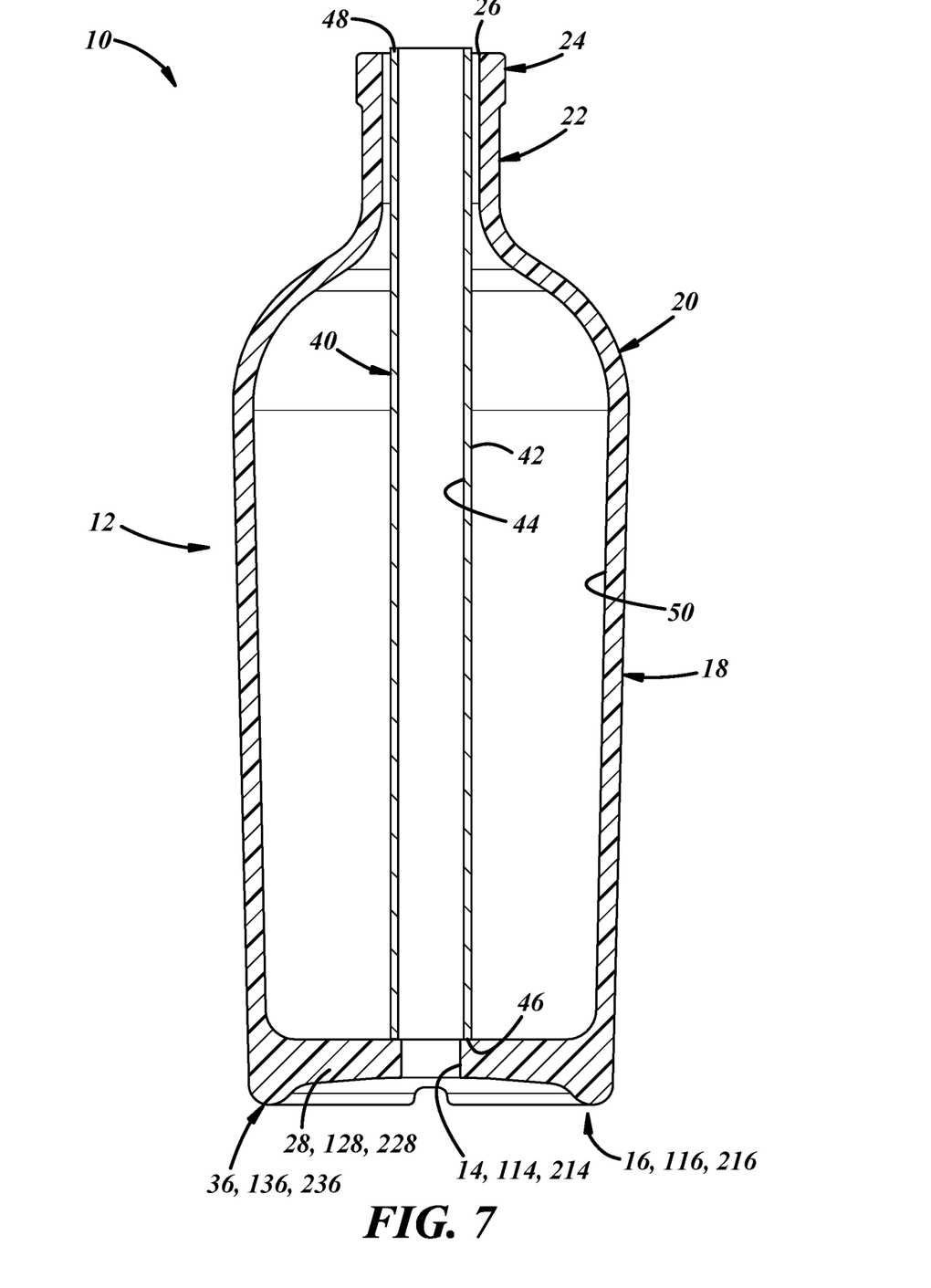
FIG. 7 is general depiction of a glass container in which a hole is being formed in a wall of the container by water jet cutting and, further, where a hollow tube is being employed to shield the inner surface of the container from the pressurized jet of water in accordance with an illustrative embodiment of the present disclosure.

The hollow tube 40 includes a shell 42 that may be composed of any suitable material such as stainless steel or a plastic. The shell 42 defines an elongated channel 44 through the tube 40 and terminates at an open first end 46 of the tube 40. The shell 42 may also terminate in an open second end 48 of the hollow tube 40 opposite the first end 46 or, alternately, it may extend continuously to a water collection reservoir located outside the container 12. In use, the tube 40 is inserted into the glass container 12 through the open mouth 26 of the neck finish 24 until the open first end 46 is located adjacent to the wall 28, 128, 228 of the base 16, 116, 216 of the container 12. The open first end 46 of the hollow tube 40 may engage the wall 28, 128, 228 such that the shell 42 abuts and makes contact with the interior surface 30, 130, 230 of the wall 28, 128, 228, or the open first end 46 of the hollow tube 40 may be displaced from the interior surface 30, 130, 230 of the wall 28, 128, 228 by a gap so long as the tube 40 is close enough to the wall 28, 128, 228 that it can capture the disbanding water jet being released into the container 12. In some instances, the hollow tube 40 may even serve as a fixture to support the glass container 12 during the water jet cutting process. A fixturing of the glass container 12 may include inverting the container 12 and then inserting the hollow tube 40 into the container 12 by moving the container downwards relative to the tube 40 until the open first end 46 of the tube 40 contacts the interior surface 30, 130, 230 of the wall 28, 128, 228 of the container 12 and supports the weight and positioning of the container 12.

Once the hollow tube 40 is in place within the glass container 12 and its open first end 46 is adjacent to the wall 28, 128, 228, the hole 14, 114, 214 is formed into the wall 28, 128, 228 as described above within the periphery of the open first end 46 in axial alignment with the elongated channel 44. As the water jet is cutting through the glass in the wall 28, 128, 228 of the container 12, at least some and preferably all the pressurized water that is forced through the wall 28, 128, 228 and into the glass container 12 as part of the cutting process—as well as any abrasive grit and glass particles that may be carried by the water jet-enters the hollow tube 40 through the open first end 46 and flows through the elongated channel 44 as opposed to being indiscriminately sprayed against the inner surface 50 of the glass container 12. The water and other material that enters the hollow tube 40 quickly loses energy and velocity within the elongated channel 44 of the tube 40 an either flows harmlessly out of the open second end 48, if present, or through the tube 40 to the collection reservoir. This protects the inner surface 50 of the glass container 12 from abrasion and the resultant frosted appearance of the glass.

Figure 3:
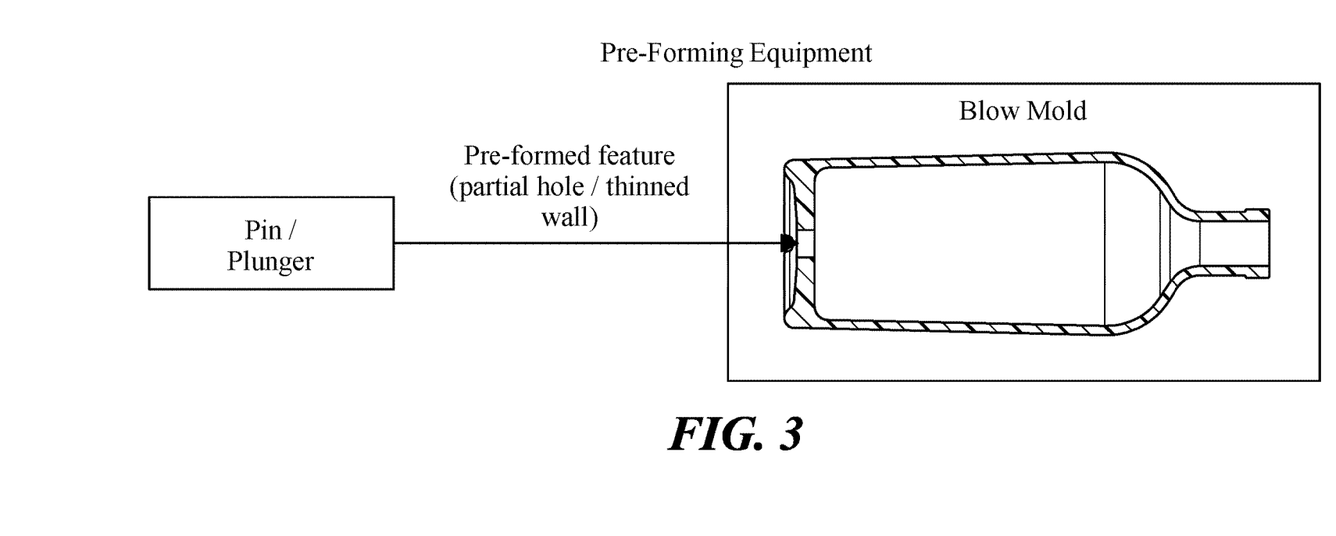
FIG. 3 is a schematic diagram of pre-processing equipment that may be used to partially pre-form the hole in the glass container of FIG. 1 in accordance with a further illustrative embodiment of the present disclosure.

With reference now to FIG. 3, and in addition to any of the embodiments disclosed herein, the wall 28, 128, 228 of the container 12 may be pre-processed before the hole 14, 114, 214 is fully produced to allow the hole 14, 114, 214 to be formed more easily and to help avoid the potential occurrence of cracks or other glass damage around the hole 14, 114, 214. In one example, the hole 14, 114, 214 may be partially formed during blow molding of the container 12 while the wall 28, 128, 228 of the container 12 is still soft—i.e., at a temperature above the softening temperature of the glass, which, for soda-lime-silica glass, typically involves a temperature ranging from 710° C. to 1220° C.). The hole 14, 114, 214 may be partially formed by blowing the container 12 against an inside surface of a blow mold that includes a projection against which the wall 28, 128, 228 of the base 16, 116, 216 of the container 12 is formed. As the wall 28, 128, 228 of the container 12 is formed, the glass flows around the projection at the location of the hole 14, 114, 214 to form an indention that serves to partially predefine the hole 14, 114, 214. In another example, a portion of the wall 28, 128, 228 that encompasses the location of the hole 14, 114, 214 may be formed with a thickness that is less than a thickness of the surrounding portion of the wall 28, 128, 228. This thin-walled portion of the wall 28, 128, 228 of the base 16, 116, 216 of the container 12 may be produced by including a cap within the blow mold in the location where the thin-walled portion of the wall 28, 128, 228 of the base 16, 116, 216 is intended. The cap may be a raised plateau over which the glass stretches during formation of the glass container 12 to therefore render the pre-identified part of the wall 28, 128, 228 that encompasses the location of the hole 14, 114, 214 thinner than the remainder of the wall 28, 128, 218.

Figure 4:
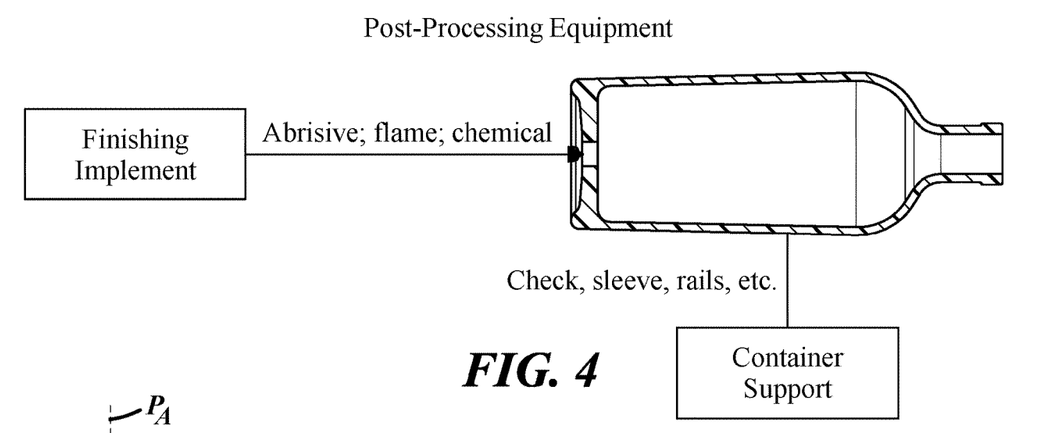
FIG. 4 is a schematic diagram of post-processing equipment that may be used to treat or remediate the hole in the glass container of FIG. 1 in accordance with an additional illustrative embodiment of the present disclosure.

Moreover, with reference now to FIG. 4, the container 12 may be post-processed after the hole 14, 114, 214 is formed to smooth the wall 28, 128, 228 of the base 16, 116, 216 of the container 12 within and/or around the hole 14, 114, 214. In one example, the hole 14, 114, 214 may be polished with an abrasive media or chemically etched with an acid to decrease the surface roughness of at least one of (i) the circumferential passage surface 34, 134, 234 of the wall 28, 128, 228, (ii) at least a portion of the interior surface 30, 130, 230 of the wall 28, 128, 228 adjacent to and surrounding the hole 14, 114, 214, or (iii) at least a portion of the exterior surface 32, 132, 232 of the wall 28, 128, 228 adjacent to and surrounding the hole 14, 114, 214. The abrasive media may be a polishing compound (e.g., cerium oxide) and/or abrasion embedded pads (e.g., diamond embedded pads) in which the embedded abrasive media is a series of pads, each having a different coarseness, arranged progressively from coarse to fine. In another example, the hole 14, 114, 214 may be polished with a flame to decrease the surface roughness of at least one of (i) the circumferential passage surface 34, 134, 234 of the wall 28, 128, 228, (ii) at least a portion of the interior surface 30, 130, 230 of the wall 28, 128, 228 adjacent to and surrounding the hole 14, 114, 214, or (iii) at least a portion of the exterior surface 32, 132, 232 of the wall 28, 128, 228 adjacent to and surrounding the hole 14, 114, 214, and to additionally heal any glass imperfections that may have developed in the wall 28, 128, 228 in and around the hole 14, 114, 214 during formation of the hole 14, 114, 214.

The container 12 with the hole 14, 114, 214 created in the wall 28, 128, 228 of its base 16, 116, 216 may be used when the package 10 is to be pressurized to a certain extent but not beyond a predetermined threshold. Such a pressurized package may be used in conjunction with certain beverages-most notably carbonated beverages that are carbonated by the individual consumer using a household beverage carbonation machine. To begin, the container 10 is formed by any suitable process. For example, conventional glass container manufacturing processes involve melting glass batch raw materials in a melter or furnace to produce molten glass, and then forming a charge or gob of the molten glass into a parison or partially-formed container within a blank mold, followed by forming the parison into the container 12 within a blow mold, with or without the container 12 being pre-processed in the blow mold as described above. Next, the hole 14, 114, 214 is formed in the base 16, 116, 216 of the container 12, and, more specifically, in the wall 28, 128, 218 of the base 16, 116, 216 of the container 12, preferably by any of the methods previously described above and most preferably by water jet cutting. After the container 12 has been made, a deformable blow-out plug P (partially and generically shown in FIG. 1) is inserted into the hole 14, 114, 214 to fluidly seal the hole 14, 114, 214 in a fluid tight manner, and a liquid beverage is introduced into the container 12 through the open mouth 26 of the neck finish 24. Several examples of the deformable blow-out plug that may be used here are disclosed in U.S. patent application Ser. No. 17/366,135, which was filed on Jul. 2, 2021, the entire contents of which are hereby incorporated by reference.

Once the container 12 has been filled with the liquid beverage, the container 12 may be closed by coupling the closure C to the neck finish 24 to close and seal the open mouth 26 and provide the pressurizable package 10. The interior of the package 10 may now be pressurized by introducing any pressurizing gas such as, for example, carbon dioxide, into the package 10. The introduction of the pressurizing gas increases the internal pressure of the package 10 and, if the pressurizing gas is carbon dioxide, may further carbonate the liquid beverage. So long as the internal pressure remains below the predetermined pressure threshold, the deformable blow-out plug remains seated within the hole 14, 114, 214. However, should the internal pressure of the package 10 exceed the predetermined internal pressure—a threshold that can be established by the size and shape of the hole 14, 114, 214 and the deformable plug as well as the material of the plug—the plug deforms and is forced through the hole 12, 114, 214 to automatically vent the package 10 and quickly decrease the internal pressure of the package 10 to ambient pressure.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of manufacturing a glass container, comprising:
   forming a glass container that includes a base having a wall;
   cutting a hole in the wall of the base by directing a jet of water at the wall of the base to erode and fluidly separate glass from the wall; and
   shielding an inner surface of the glass container from at least a portion of the jet of water that passes through the wall of the base of the container during cutting of the hole.

2. The method set forth in claim 1, wherein shielding the inner surface of the glass container comprises inserting a hollow tube into the container such that an open free end of the tube is located adjacent to the wall of the base of the container, and wherein at least a portion of the jet of water that passes through the wall when cutting the hole enters the hollow tube and flows therethrough.

3. The method of claim 1, wherein the glass container is formed within a blow mold, and further comprising:
   pre-processing the glass container while the glass container is still in the blow mold to either partially form the hole in the wall of the base or form a thin-portion of the wall that encompasses a location of the hole and has a reduced thickness compared to a surrounding portion of the wall.

4. A method of manufacturing a glass container, comprising:
   providing a glass container that includes a base and a body extending away from the base along a longitudinal container axis, the base of the container including a wall; and
   cutting a hole in the base of the container by directing a pressurized jet of water at the base to thereby fluidly separate glass material from the wall and form the hole, wherein the hole extends through the wall of the base, along a hole passage axis, between an interior surface of the wall and an exterior surface of the wall; and
   shielding an inner surface of the glass container from at least a portion of the jet of water that passes through the wall of the base and into an inside of the container during cutting of the hole.

5. The method set forth in claim 4, wherein shielding the inner surface of the glass container comprises positioning an open free end of a hollow tube adjacent to the interior surface of the wall of the base of the container such that at least a portion of the jet of water that passes through the wall when cutting the hole enters the hollow tube and flows therethrough.

6. The method set forth in claim 4, wherein the hole is tapered so that the hole increases in size along the hole passage axis from the interior surface of the wall to the exterior surface of the wall, or wherein the hole is tapered so that the hole decreases in size along the hole passage axis from the interior surface of the wall to the exterior surface of the wall.

7. The method set forth in claim 4, wherein the glass container includes an indentation in the wall of the base of the container that partially forms the hole.

8. The method set forth in claim 4, wherein the wall of the base of the container includes a thin-walled portion having a thickness that is less than a thickness of a surrounding portion of the wall, and wherein cutting the hole comprises cutting the hole in the thin-walled portion of the wall of the base of the container.

9. The method set forth in claim 4, further comprising:
   smoothing the hole after cutting the hole in the wall of the base of the container.

10. The method set forth in claim 4, wherein the hole passage axis is aligned with and the same as the longitudinal container axis.

11. The method set forth in claim 4, wherein providing the glass container comprises forming the glass container from molten glass.

12. A method comprising:
   providing a glass container that extends along and is centered about a longitudinal container axis, the glass container including a base, a body extending away from the base along the longitudinal container axis, a shoulder extending away from the body, and a neck extending away from the shoulder and terminating in a neck finish having an open mouth, the base of the container including a wall that has an interior surface within the container and an exterior surface outside of the container;
   cutting a hole in the wall of the base of the container, the hole extending fully through the wall from the interior surface of the wall to the exterior surface of the wall;
   inserting a deformable blow-out plug into the hole to fluidly seal the hole;
   introducing a liquid beverage into the container through the open mouth of the neck finish;
   coupling a closure to the neck finish of the neck of the container to close the container and provide a pressurizable package; and
   internally pressurizing the package by introducing a pressurizing gas into the package and raising an internal pressure of the package while the deformable blow-out plug remains in the hole of the wall of the base of the container.

13. A method comprising:
   providing a glass container that extends along and is centered about a longitudinal container axis, the glass container including a base opposite an open mouth of the container and a body extending away from the base along the longitudinal container axis, the base of the container including a wall that has an interior surface within the container and an exterior surface outside of the container, and wherein the wall of the base of the container defines a hole that extends fully through the wall from the interior surface of the wall to the exterior surface of the wall;
   inserting a deformable blow-out plug into the hole to fluidly seal the hole;
   introducing a liquid beverage into the container through the open mouth of the container; and
   carbonating the liquid beverage in the container by introducing carbon dioxide into the liquid beverage while the deformable blow-out plug remains in the hole of the wall of the base of the container, the deformable blow-out plug being configured to deform and be forced through the hole to vent the container at an internal pressure of the container that is less than a pressure at which the container will burst.

* * * * *